US012680473B2

(12) United States Patent
Garnier et al.

(10) Patent No.: US 12,680,473 B2
(45) Date of Patent: Jul. 14, 2026

(54) ROLLER BEARING COMPRISING AN OIL FILM COMPRESSION DAMPER OF MODIFIABLE LENGTH

(71) Applicant: SAFRAN AIRCRAFT ENGINES, Paris (FR)

(72) Inventors: Florian Garnier, Moissy-Cramayel (FR); Cécile Noyer, Moissy-Cramayel (FR); Morgane Soubeyroux, Moissy-Cramayel (FR); Charlotte Zuckerfeld, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 24 days.

(21) Appl. No.: 18/864,060

(22) PCT Filed: May 9, 2023

(86) PCT No.: PCT/EP2023/062307
§ 371 (c)(1),
(2) Date: Nov. 8, 2024

(87) PCT Pub. No.: WO2023/217797
PCT Pub. Date: Nov. 16, 2023

(65) Prior Publication Data
US 2025/0305424 A1      Oct. 2, 2025

(30) Foreign Application Priority Data

May 10, 2022 (FR) ....................................... 2204416

(51) Int. Cl.
*F01D 25/16* (2006.01)
*F16C 27/04* (2006.01)

(52) U.S. Cl.
CPC .......... *F01D 25/164* (2013.01); *F16C 27/045* (2013.01); *F16C 2360/23* (2013.01)

(58) Field of Classification Search
CPC ... F16C 27/045; F16C 2360/23; F01D 25/164
See application file for complete search history.

(56) References Cited

U.S. PATENT DOCUMENTS 5,058,452 A      10/1991 El-Shafei
5,149,206 A  *   9/1992 Bobo ..................... F01D 25/164
                                            248/562

(Continued)

FOREIGN PATENT DOCUMENTS

JP        H06109018 A      4/1994
JP        2017194159 A     10/2017

OTHER PUBLICATIONS

Search Report and Written Opinion for International Application No. PCT/EP2023/062307 dated Jun. 21, 2023.

*Primary Examiner* — Phillip A Johnson
(74) *Attorney, Agent, or Firm* — McDonald Hopkins LLC

(57) ABSTRACT

A bearing for a turbine engine includes an oil film compression damper, including an inner sleeve intended to receive an outer ring of a roller bearing, an outer sleeve surrounding the inner sleeve and delimiting with this inner sleeve, an axisymmetric cavity supplied hydraulically in order to form a film of damping oil, this cavity being closed at its ends by two segments. The cavity includes a first portion and a second portion separated from one another by a movable segment able to occupy a closed position in which it forms a controlled sealing barrier between the two portions, and an open position in which the two portions communicate with one another, and in that it is the first portion that is supplied hydraulically to form the film of oil.

9 Claims, 4 Drawing Sheets

(56)  References Cited

U.S. PATENT DOCUMENTS

| 5,531,522 | A | * | 7/1996 | Ide | F16C 17/035 |
| | | | | | 384/535 |
| 10,400,819 | B2 | * | 9/2019 | Takaoka | F16C 35/063 |
| 10,502,096 | B2 | * | 12/2019 | Orkiszewski | F01D 25/18 |

* cited by examiner

ROLLER BEARING COMPRISING AN OIL FILM COMPRESSION DAMPER OF MODIFIABLE LENGTH

CROSS-REFERENCE TO RELATED APPLICATIONS

This is the National Stage application of PCT international application PCT/EP2023/062307, filed on May 9, 2023, which claims the priority of French Patent Application No. 2204416, filed May 10, 2022, both of which are incorporated herein by reference in their entireties.

TECHNICAL FIELD

The invention relates to a roller bearing mounted on a flexible suspension equipped with an oil film compression damper, intended to equip a turbine engine such as a turbojet engine.

PRIOR ART

In a turbojet engine, marked by 1 in FIG. 1, air is admitted into an inlet sleeve 2 located upstream AM to pass through a fan including a series of rotary vanes 3 before splitting into a central primary flow and a secondary flow surrounding the primary flow.

The primary flow is compressed by low-pressure 4 and high-pressure 5 compressors before reaching a combustion chamber 6, after which it expands by passing through a high-pressure turbine 7 and a low-pressure turbine 8, before being released downstream AV generating an auxiliary thrust. The secondary flow is, in turn, propelled directly by the fan downstream AV to generate a main thrust.

Each turbine 7, 8 includes series of vanes radially oriented and evenly spaced about a main axis of rotation AX, an outer casing 9 surrounding the whole engine.

In the case of a twin-spool turbojet engine, the high-pressure compressor and the high-pressure turbine form part of a high-pressure body that surrounds a low-pressure shaft and rotates at a speed different from the latter, this low-pressure shaft carrying the low-pressure compressor and the low-pressure turbine.

The low-pressure shaft and the high-pressure body are carried upstream and downstream, by bearings housed in enclosures isolating them from the rest of the engine. Each bearing is lubricated by oil flowing in the enclosure that surrounds it, and that is delimited by fixed elements and by the rotary element that passes through it.

Such a bearing that is carried by a support while being surrounded by the enclosure is generally of the roller bearing type mounted on a flexible suspension being equipped with an oil film compression damper.

In practice, such a bearing, shown in FIG. 2 where it is marked by 11, includes an inner sleeve 12 receiving an outer ring of a roller bearing 13 carrying a rotary element 14 that is for example a low-pressure shaft or a high-pressure body. This bearing 13 more particularly includes an inner ring 13*a*, rolling elements 13*b* that here are rollers, and an outer ring 13*c*. This bearing 11 also includes an outer sleeve 16 of larger diameter that coaxially surrounds the inner sleeve 12 being radially spaced apart from the latter, so that these two sleeves jointly delimit an inner axisymmetric cavity 17. This cavity is closed by two segments 18 and 19 located at its ends that are carried by the inner sleeve 12.

The inner sleeve 12 is secured to the rest of the bearing by a flexible connection giving this inner sleeve a limited mobility in the radial direction in relation to the axis AX of rotation of the rotary element.

The inner cavity 17 is pressurised with oil, so that in the case of imbalance of the rotary element 14, the inner sleeve 12 moves off-centre from the axis AX in the direction of the imbalance under the effect of the centrifugal forces that this imbalance generates, so that during operation this off-centring rotates with the rotary element. The hydraulic pressurisation of the cavity 17 thus makes it possible to dampen the off-centring to limit the vibrations generated by the presence of the imbalance.

Generally, such a system makes it possible to ensure damping of the vibrations that is limited to a given range of speeds of the engine.

The aim of the invention is to provide a solution making it possible for such a system to ensure damping for various operating conditions of the engine.

DISCLOSURE OF THE INVENTION

To this end, the object of the invention is a bearing for a turbine engine comprising an oil film compression damper, including an inner sleeve intended to receive an outer ring of a roller bearing, an outer sleeve surrounding the inner sleeve and delimiting with this inner sleeve, an axisymmetric cavity supplied hydraulically in order to form a film of damping oil, this cavity being closed at its ends by two segments, characterised in that the cavity includes a first portion and a second portion separated from one another by a radially movable segment able to occupy a closed position wherein it forms a controlled sealing barrier between the two portions, and an open position wherein the two portions communicate with one another, and in that the first portion is supplied hydraulically to form the film of oil.

The invention makes it possible to modify the geometry of the cavity enclosing the film of damping oil, by placing the movable segment at the open position thereof or at the closed position thereof so that the cavity has a maximum or minimum length. This makes it possible to obtain two damping values, and thereby, to ensure damping on two speed ranges of the engine.

The invention also relates to a bearing thus defined, comprising a circumferential groove formed at an inner face of the outer sleeve, wherein the movable segment is retracted in this groove when it occupies the open position thereof, and wherein the movable segment is out of this groove supported on an outer face of the inner sleeve when it occupies the closed position thereof.

The invention also relates to a bearing thus defined, comprising radial holes passing through an outer face of the outer sleeve and leading to the bottom of the groove, wherein the movable segment includes a plurality of sectors in an arc of a circle each provided with a pin sliding in a radial hole.

The invention also relates to a bearing thus defined, wherein the movable segment is formed of three sectors each having an angular extension of 120 degrees.

The invention also relates to a bearing thus defined, comprising an actuator cooperating with the pins to radially move them so as to control the movable segment to move it from the open position thereof to the closed position thereof and vice versa.

The invention also relates to a bearing thus defined, comprising a hydraulic or pneumatic control circuit cooperating with the pins to radially move them so as to control the movable segment to move it from the open position thereof to the closed position thereof and vice versa.

The invention also relates to a bearing thus defined, wherein the control circuit includes a circumferential cavity extending in the thickness of the outer sleeve and wherein the ends of the pins lead, this circumferential cavity being supplied hydraulically or pneumatically.

The invention also relates to a turbine engine equipped with a bearing thus defined.

The invention also relates to a turbojet engine comprising a turbine engine thus defined.

DETAILED DISCLOSURE OF PARTICULAR EMBODIMENTS

The idea behind the invention is to modify the geometry of the axisymmetric cavity of the bearing that is pressurised in order to have two possible oil film lengths during operation, thanks to a sealing segment with two positions.

These two lengths make it possible to have two distinct damping values using a fixed supply pressure. These two values make it possible to modify the damping ensured by the cavity on two given frequency ranges, that is to say on two speed ranges of the engine.

Figure 1:
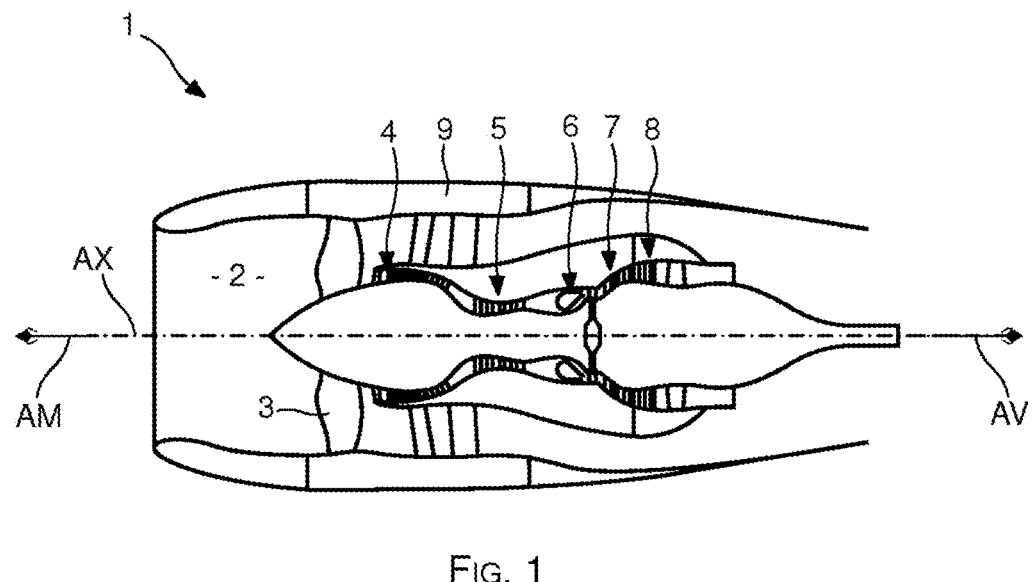
FIG. 1 is a longitudinal sectional view of a known bypass turbojet engine.
Figure 2:
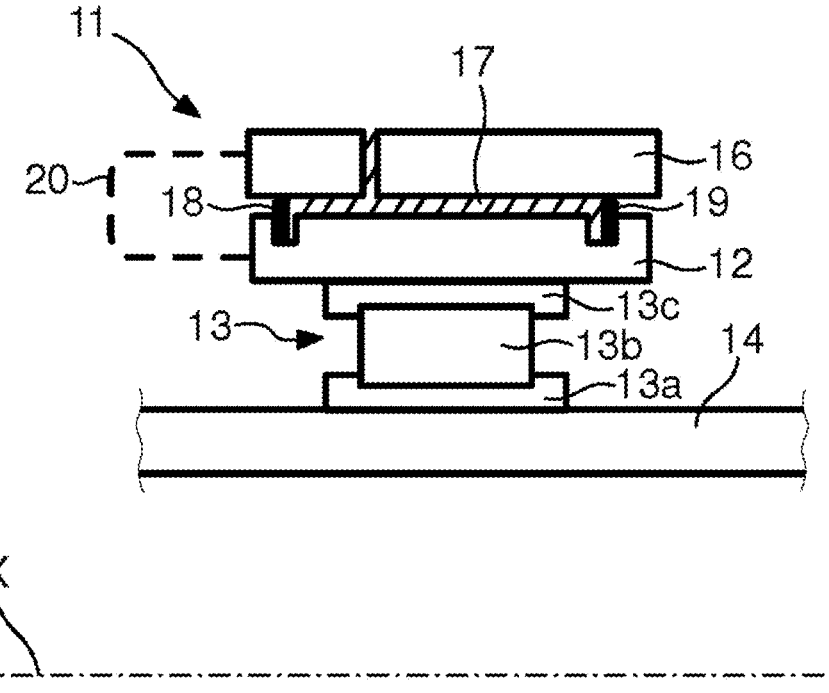
FIG. 2 is a partial longitudinal sectional view of a bearing integrating a known oil film damper.
Figure 3:
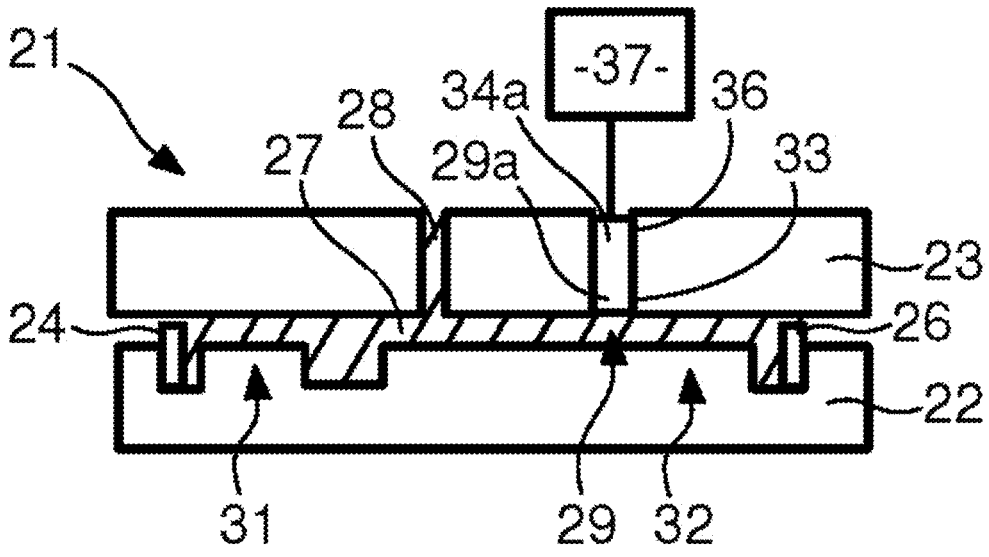
FIG. 3 is a partial longitudinal sectional view of a bearing integrating an oil film damper according to the invention when the inner cavity thereof has a maximum length.

In FIG. 3, a bearing 21 includes an inner sleeve 22 receiving an outer ring of a roller bearing carrying a low-pressure shaft or a high-pressure body. This bearing 21 further includes an outer sleeve 23 that coaxially surrounds the sleeve 22 being radially spaced apart to delimit with the latter an inner axisymmetric cavity 27. This cavity is closed by two segments 24 and 26 located at its ends that are carried by the inner sleeve 22.

The inner sleeve 22 is secured to the rest of the bearing by a flexible connection 20 schematically shown in FIG. 3, which gives it a limited mobility in the radial direction in relation to the axis AX of rotation of the rotary element.

The outer sleeve 23 includes radial holes connected to a hydraulic circuit not shown for pressurising the inner cavity 27 with oil, one of these holes being marked by 28 in the figures. An imbalance of the rotary element tends to move the inner sleeve 22 off-centre from the axis AX in the direction of the imbalance under the effect of the centrifugal forces that this imbalance generates, insofar as during operation this off-centring rotates with the rotary element. The hydraulic pressurisation of the cavity 27 makes it possible to dampen the off-centring rotary motion of the inner sleeve 22 to limit the vibrations generated in the whole of the engine by the imbalance.

Figure 4:
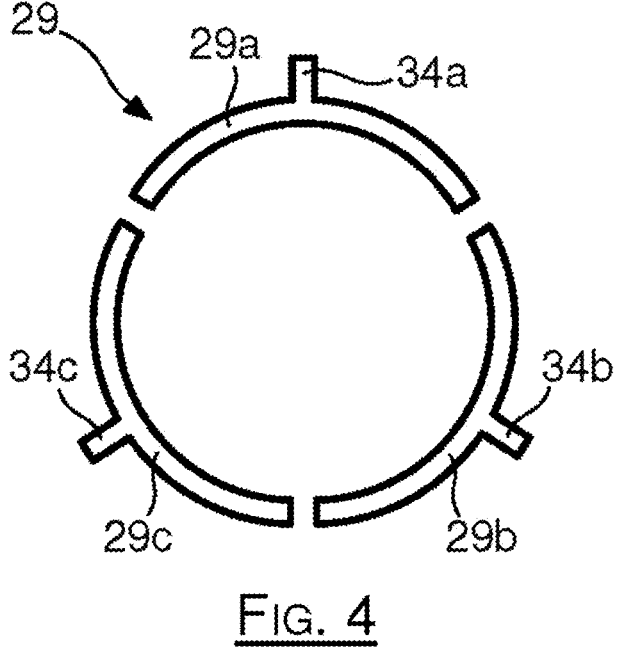
FIG. 4 is a front view of the movable segment of the oil film damper according to the invention when it is in open position.
Figure 5:
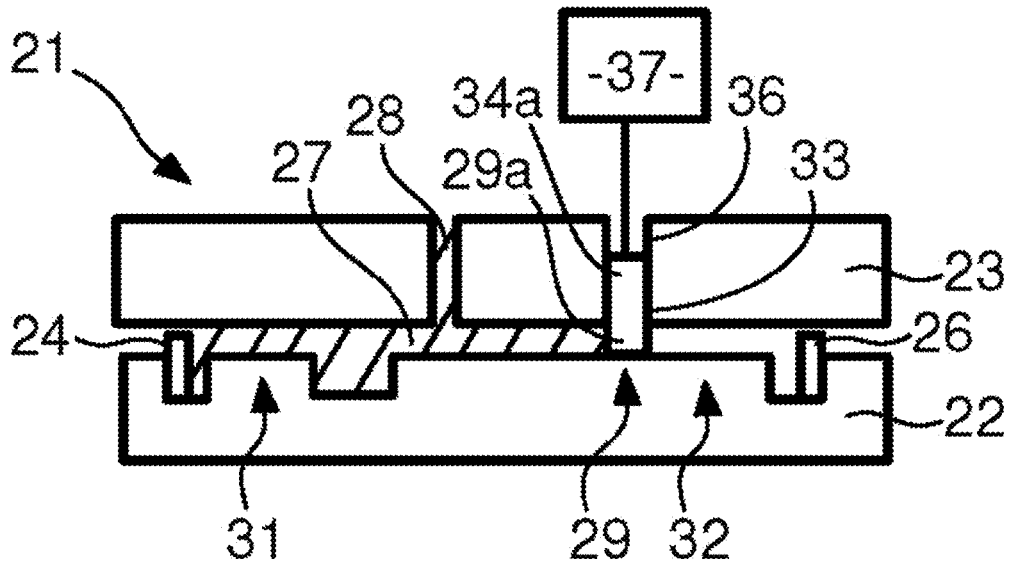
FIG. 5 is a partial longitudinal sectional view of a bearing integrating an oil film damper according to the invention when the inner cavity thereof has a minimum length.
Figure 6:
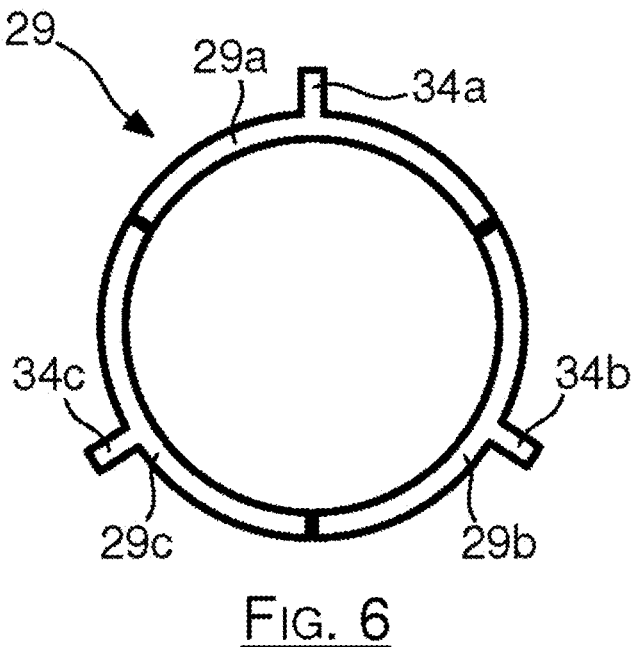
FIG. 6 is a front view of the movable segment of the oil film damper according to the invention when it is in closed position.

According to the invention, the cavity 27 is equipped with a segment 29 that is radially movable between an open position corresponding to FIGS. 3 and 4, and a closed position corresponding to FIGS. 5 and 6.

When it occupies the closed position thereof, the segment 29 separates the cavity 27 into a first portion 31 that is hydraulically pressurised and a second portion 32 that is not pressurised, so that the cavity 27 then has a length reduced to that of the first portion thereof. The segment 29 then forms a controlled sealing barrier between the two portions, insofar as it limits the oil transfer from one portion to the other at the lowest possible and ideally zero speed value.

When it occupies the open position thereof, the segment 29 places in communication the first and second portions 31 and 32 of the cavity 27 so that this cavity 27 has an extended, that is to say maximum, length.

This movable segment 29 is housed in a groove 33 in the inner face of the outer sleeve 23, in such a way that when it occupies the open position thereof, this segment 29 is entirely retracted in the groove. When it occupies the closed position thereof, this segment 29 comes out of the groove towards the axis AX in such a way as to grip the outer face of the inner sleeve 22 to form a circumferential sealed separation interposed between the first portion 31 and the second portion 32. The radially movable segment 29 thus has a larger diameter when it is in open position than when it is in closed position.

To this end, the movable segment 29 may be formed of three sectors 29a, 29b and 29c each of 120 degrees, as can be seen in FIGS. 4 and 6. The sector 29a has a flat crown portion shape provided in its central regions with a radial pin 34a extending opposite the axis AX. The two other sectors 29b and 29c are identical to the sector 29a and each include a radial pin 34b, 34c.

The outer sleeve 23 includes for its part three radial through-holes spaced 120 degrees apart about the axis AX, which each lead into the groove 33 and each have a diameter substantially corresponding to the thickness of the sectors of the segment, that is to say the diameter of the pins. One of these holes, marked by 36, can be seen in FIGS. 3 and 5.

The mounting of the segment sector 29a thus consists in placing it into the groove 33 by engaging the pin 34a thereof into the corresponding radial hole 36 that leads into the bottom of this groove. The segment 29 is entirely mounted in the outer sleeve 23 once the two other sectors 29b and 29c have been engaged in the groove 33 with the respective pins thereof in the remaining radial holes, in the same way.

The radial pins 34a, 34b and 34c are thus guided by the radial holes wherein they are engaged, in order to be movable between a position supported at the bottom of the groove corresponding to the open position of the segment, and a position supported at the outer face of the inner sleeve corresponding to the closed position of the segment.

The segment 29 may be controlled to change from the open position thereof to the closed position thereof and vice versa, by means of controlled actuators acting on the pins 34a, 34b and 34c, such as the actuator marked by 37.

This actuator 37 is for example an electric actuator, located radially on the outside of the outer sleeve 23 and opposite the radial hole 36, and that includes a radially movable rod that is supported on the pin 34a.

This control may also be ensured by means of electromagnets acting on these pins, or other.

Figure 7:
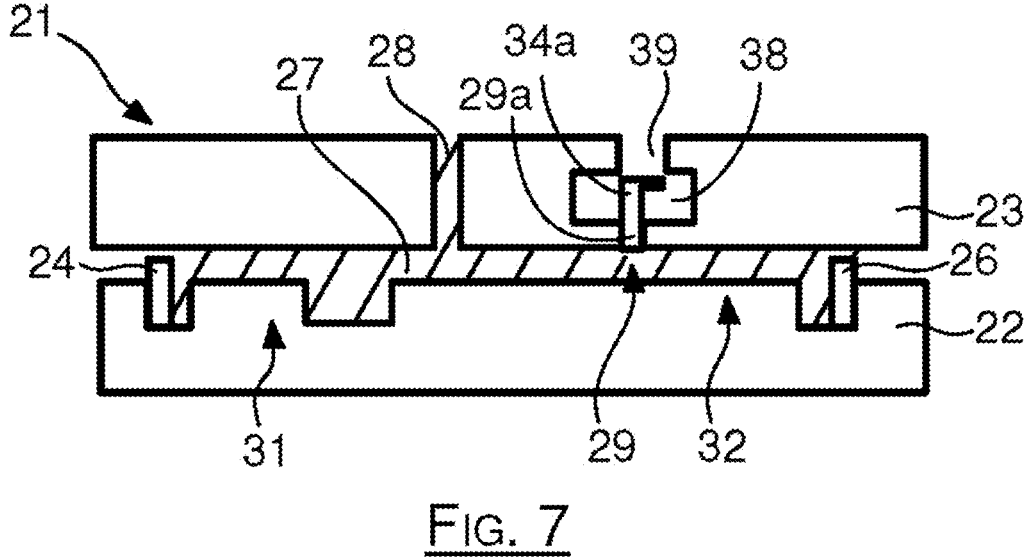
FIG. 7 is a partial longitudinal sectional view of a bearing integrating an oil film damper according to an alternative embodiment of the invention when the inner cavity thereof has a maximum length.
Figure 8:
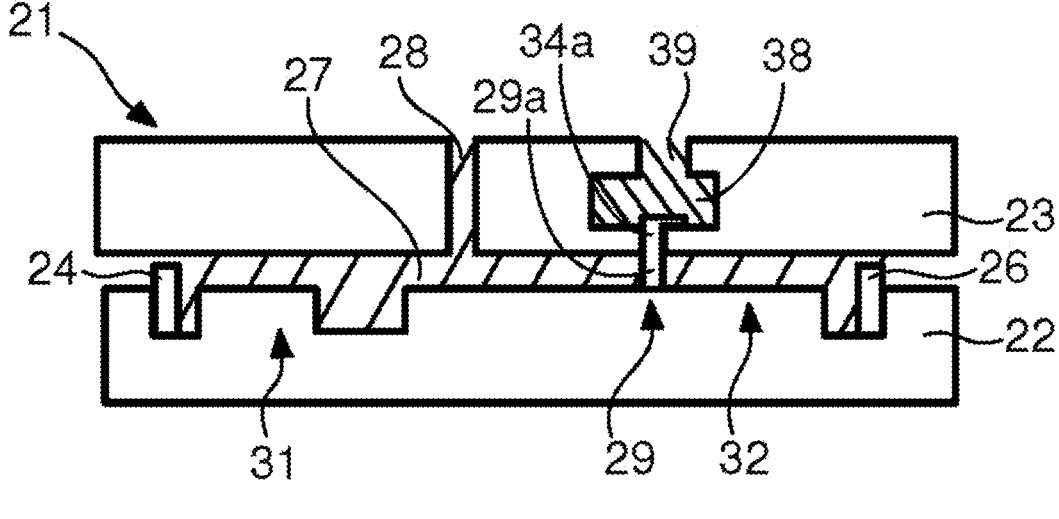
FIG. 8 is a partial longitudinal sectional view of a bearing integrating an oil film damper according to an alternative embodiment of the invention when the inner cavity thereof has a minimum length.

In the example of FIGS. 7 and 8, the movement of the sectors between the closed position and the open position is ensured by connecting the radial holes to a hydraulic or pneumatic control circuit, the pins 34a, 34b and 34c, such that these pins act as pistons. Pressurising the control circuit then makes it possible to move the pins closer to the axis AX, and thereby the sectors that carry them so that these sectors come out of the groove 33 and grip the outer face of the sleeve 22, which corresponds to the closed position.

Depressurising the control circuit conversely makes it possible to enable the pins to move radially outwardly so that the sectors go back into the groove 33, under the effect of the higher pressure prevailing in the cavity 27, which corresponds to the open position.

In the example of FIGS. 7 and 8, this control circuit essentially includes a circumferential cavity 38 formed in the thickness of the outer sleeve 23, wherein the pins 34a, 34b and 34c lead. Additionally, a supply orifice 39 passes through the outer face of the sleeve 23 to lead into the cavity 38, which makes it possible to connect it to a hydraulic or pneumatic circuit, to pressurise it in order to place the segment 29 in closed position as in FIG. 8, or to depressurise it in order to place this segment in open position as in FIG. 7.

Generally, the sizing of the cavity 27 delimiting the film of oil, the choice of the position of the movable segment 29 in this cavity make it possible to define two damping levels and to size them corresponding for example to two operating speed ranges of the engine. The activation of one or other of the dampers is ensured by controlling the movable segment so that it occupies the closed position thereof or the open position thereof.

The invention claimed is:

1. A bearing for a turbine engine comprising an oil film compression damper, including an inner sleeve intended to receive an outer ring of a roller bearing, an outer sleeve surrounding the inner sleeve and delimiting with the inner sleeve an axisymmetric cavity supplied hydraulically in order to form a film of damping oil, the ends of the cavity being closed by two segments, wherein the cavity includes a first portion and a second portion separated from one another by a radially movable segment able to occupy a closed position wherein the movable segment forms a controlled sealing barrier between the first and second portions, and an open position wherein the first and second portions communicate with one another, and in that the first portion is supplied hydraulically to form the film of oil.

2. The bearing according to claim 1, comprising a circumferential groove formed at an inner face of the outer sleeve, wherein the movable segment is retracted in the groove when the movable segment occupies the open position, and wherein the movable segment comes out of the groove to be supported on the outer face of the inner sleeve when the movable segment occupies the closed position.

3. The bearing according to claim 2, comprising radial holes passing through an outer face of the outer sleeve and leading to the bottom of the groove, and wherein the movable segment includes a plurality of sectors in an arc of a circle, each sector provided with a pin sliding in a radial hole.

4. The bearing according to claim 3, wherein the movable segment is formed of three sectors, each sector having an angular extension of 120 degrees.

5. The bearing according to claim 3, comprising an actuator cooperating with each pin to radially move each pin in such a way as to control the movable segment to move the movable segment from the open position to the closed position and vice versa.

6. The bearing according to claim 3, comprising a hydraulic or pneumatic control circuit cooperating with each pin to radially move each pin in such a way as to control the movable segment to move the movable circuit from the open position to the closed position and vice versa.

7. The bearing according to claim 6, wherein the control circuit includes a circumferential cavity extending into the thickness of the outer sleeve and wherein the ends of each pin lead, the circumferential cavity being supplied hydraulically or pneumatically.

8. A turbine engine equipped with the bearing according claim 1.

9. A turbojet engine comprising the turbine engine according to claim 8.

* * * * *